United States Patent
Vembu et al.

(10) Patent No.: US 9,955,197 B2
(45) Date of Patent: Apr. 24, 2018

(54) ENCRYPTED SCREENCASTING

(71) Applicant: Intel Corporation, Santa Clara, CA (US)

(72) Inventors: Balaji Vembu, Folsom, CA (US); Scott Janus, Rocklin, CA (US); Changliang Wang, Bellevue, WA (US)

(73) Assignee: Intel Corporation, Santa Clara, CA (US)

( * ) Notice: Subject to any disclaimer, the term of this patent is extended or adjusted under 35 U.S.C. 154(b) by 9 days.

(21) Appl. No.: 14/494,707

(22) Filed: Sep. 24, 2014

(65) Prior Publication Data

US 2015/0312524 A1 Oct. 29, 2015

Related U.S. Application Data

(60) Provisional application No. 61/983,592, filed on Apr. 24, 2014.

(51) Int. Cl.
| | | |
|---|---|---|
| *H04N 7/167* | (2011.01) | |
| *H04N 21/2347* | (2011.01) | |
| *H04N 21/418* | (2011.01) | |
| *H04N 21/4405* | (2011.01) | |

(52) U.S. Cl.
CPC ..... *H04N 21/2347* (2013.01); *H04N 21/4181* (2013.01); *H04N 21/4405* (2013.01)

(58) Field of Classification Search
CPC .. H04N 7/167; H04N 7/1675; H04N 21/2347; H04N 21/4181; H04N 21/4405
See application file for complete search history.

(56) References Cited

U.S. PATENT DOCUMENTS

| | | | | |
|---|---|---|---|---|
| 2005/0091198 A1* | 4/2005 | Dettinger | .......... | G06F 17/30398 |
| 2005/0144468 A1* | 6/2005 | Northcutt | ................ | G06F 21/10 |
| | | | | 713/189 |
| 2006/0209892 A1* | 9/2006 | MacMullan | ........... | H04N 5/775 |
| | | | | 370/468 |
| 2008/0172708 A1* | 7/2008 | Perry | ................... | H04W 72/005 |
| | | | | 725/110 |
| 2010/0263011 A1* | 10/2010 | McMurtrie | ........ | H04N 7/17318 |
| | | | | 725/110 |
| 2013/0346562 A1 | 12/2013 | Kim | | |
| 2014/0161196 A1* | 6/2014 | Culebro | ................. | H04N 19/40 |
| | | | | 375/240.26 |
| 2014/0365611 A1* | 12/2014 | Praveenkumar | ........ | H04L 69/24 |
| | | | | 709/219 |
| 2015/0081866 A1* | 3/2015 | Cohen | ..................... | H04L 69/03 |
| | | | | 709/223 |

OTHER PUBLICATIONS

HDCP Deciphered White Paper, Jul. 2008.*
TW office action in corresponding TW application No. 104107615 dated Sep. 5, 2016.
HDPC Deciphered White Paper, Jul. 2008.
"HDCP deciphered whiter paper", Digital Content Protection LLC, p. 6 line 7-31.
CN office action dated Aug. 2, 2017 in corresponding CN application No. 201510129309.5, 10 pages (no English translation).

* cited by examiner

*Primary Examiner* — Meng Li
(74) *Attorney, Agent, or Firm* — Trop Pruner & Hu, P.C.

(57) ABSTRACT

Encryption and encoding of video and/or audio may be implemented on an integrated circuit before being transmitted wirelessly to a remote adapter for display.

13 Claims, 3 Drawing Sheets

ENCRYPTED SCREENCASTING

CROSS-REFERENCE TO RELATED APPLICATION

This is a non-provisional application claiming priority to provisional application Ser. No. 61/983,592 filed Apr. 24, 2014, which is hereby expressly incorporated by reference herein.

BACKGROUND

Peer-to-peer wireless screencasting enables wireless delivery of audio and video to or from desktops, tablets, mobile phones, and other devices. An example of peer-to-peer screencasting is Miracast, which is a standard that uses Wi-Fi Direct connections like Bluetooth. Miracast can enable displaying video from a phone or tablet on a television, sharing a laptop display with a conference room projector, and watching live programs from a home cable box on a laptop. One pertinent specification is the Wi-Fi Display technical specification version 1.0.0, available from the Wi-Fi Alliance Technical Committee, Wi-Fi Display Technical Task Group, dated 2012, however, other specifications may also be applicable.

A peer-to-peer screencasting technique may allow a portable device or computer to securely send high definition (HD) or ultra high definition video to another device via a wireless connection using the High-bandwidth Digital Content Protection system, called HDCP2, pursuant to the Interface Independent Adaption specification, revision 2.2, dated Oct. 16, 2012, available from Digital Content Protection LLC. HDCP2 is a link protection protocol to authenticate two wirelessly connected devices. HDCP2 encrypts video and audio data to ensure confidentiality of data.

The HDCP2 link has two constituent links including a unidirectional high speed stream transporting audio/visual content and a lower speed bidirectional link used for controlling status. Video in an HDCP transmitter, together with any associated audio or data streams, is carried as an Motion Picture's Experts Group (MPEG) packetized elementary stream (PES). Each PES stream is encrypted.

BRIEF DESCRIPTION OF THE DRAWINGS

Some embodiments are described with respect to the following figures.

DETAILED DESCRIPTION

Conventionally, the HDCP2 encryption is done in a different hardware unit, separate from the encoder that actually does the encoding. This hardware separation may raise performance and power consumption concerns since there are additional memory reads/writes for this approach. Moreover, the encoder has to write the bitstream into an encoded buffer in a memory and then the encryption module reads from it. There are also security concerns because the output of the encoded buffer may not be protected before it reaches an encryption module. In addition, software complexity may arise because there are two software calls. The first call is to encode and the second call is to encrypt. As a result, additional buffers must be allocated. Finally, there is a latency concern due to the extra software call and the memory read/write.

The encoder and encryption module may, instead, be integrated into one hardware integrated circuit component that does both the encoding and the encryption. A software component can complete the encoding and encryption in one application program interface call in some embodiments. Since the encoder directly encrypts the content without extra memory reads and writes, performance may be improved, in some cases. Since the encoded content in memory is encrypted natively, security concerns may be reduced in some embodiments. Since the software does not need to allocate extra buffers, one encoder call may support encoding and encryption, reducing software complexity in some cases. Latency may be reduced due to the lack of an extra memory read or write in some embodiments.

Figure 1:
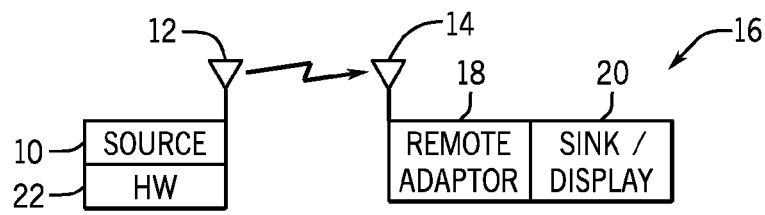
FIG. 1 is a schematic depiction for one embodiment.

Thus, referring to FIG. 1, an originating or source device 10, which may be any processor-based device, including a laptop, a tablet, a cellular telephone, or a desktop computer, communicates with a remote sink/display device 16. The device 16 may include any type of visual display, including a television or a projector. The originating device, which may be called the source, may include a hardware component 22 that does authentication, encoding, and encrypting all in one integrated circuit.

The source 10 transmits video and audio through an antenna 12 over a Wi-Fi connection to the sink/display device 16, which also includes an antenna 14. Other communication techniques may also be used including cellular, Bluetooth, infrared, or hard wired connections. The sink/display device 16 may include a remote adapter 18 that adapts the sink/display 20 to the wireless standard being used. It may be integrated into the sink or it may be a separate device, such as a dongle or receiver.

The source 10 may be a Wi-Fi display source. A Wi-Fi display source is a device that supports streaming multimedia content to a Wi-Fi display sink over a Wi-Fi link and may support a single Wi-Fi display session. During such a Wi-Fi display session, the source transmits a Motion Picture Experts Group (MPEG)2 transport stream (TS) to one Wi-Fi display sink. See ISO/IEC standard 13818-1 or ITU-T Rec. H.222.0 (05/2006). A Wi-Fi display source may transmit an MPEG2 transport stream that contains a multiplexed single audio and a single video elementary stream. The source may transmit an MPEG2-TS that contains only video streams or transmit an MPEG2-TS that contains only an audio stream.

The sink/display 20 may be a Wi-Fi display sink. A Wi-Fi display sink is a device that receives multimedia content from a Wi-Fi display source over a Wi-Fi link, renders it and supports a single Wi-Fi display session. There are primary sinks and secondary sinks. A primary sink is a device that supports rendering video content only or both audio and video content and supports receiving MPEG2-TS from a Wi-Fi display source. The primary sink supports receiving an MPEG2-TS that contains multiplex single audio elementary stream and single video elementary stream. A secondary sink is a device that supports rendering only audio content and supports receiving an MPEG2-TS from one Wi-Fi display source. It supports receiving an MPEG2-TS that contains an audio elementary stream.

There are four kinds of Wi-Fi display sessions. There is an audio only Wi-Fi display session where there is only one primary sink or one secondary sink. A video only Wi-Fi display session is where there is only one primary sink. An audio/video Wi-Fi display session is where there is only one primary sink, that renders both video and audio. An audio/video Wi-Fi display session is where there are coupled Wi-Fi display sinks and the primary sink renders video while the secondary sink renders a corresponding audio. A coupled Wi-Fi display sink transmits video content to a primary sink and transmits audio content to a secondary sink, after coupling is established between primary and secondary sinks.

Figure 2:
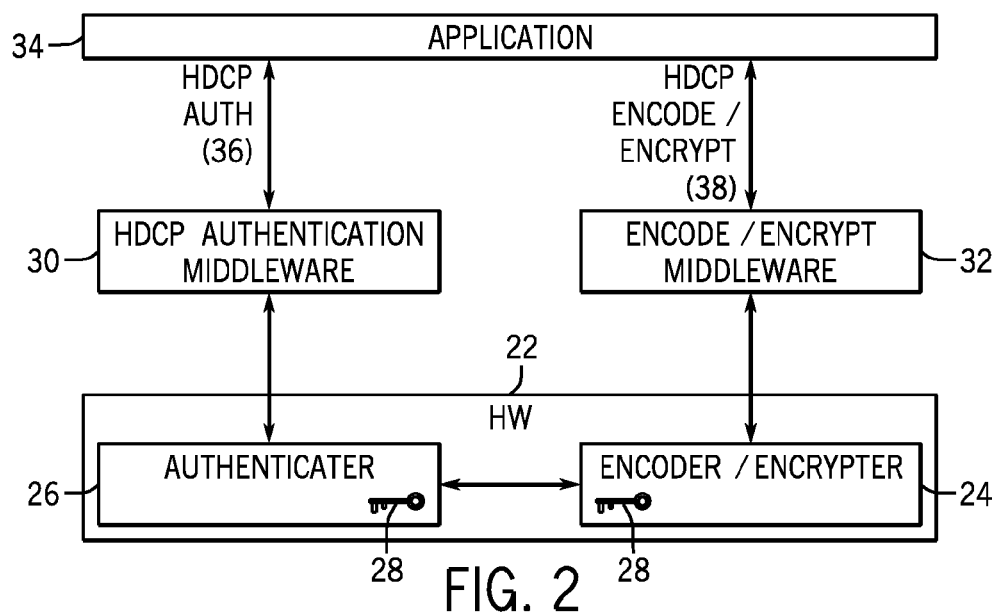
FIG. 2 is a software depiction for one embodiment.

A wfd-content-protection parameter specifies whether the Wi-Fi display sink supports HDCP2 for content protection. If content protection is not supported or is not currently possible for any reason, the parameter is set to "none." If content protection is supported, the parameter is set to "HDCP2.0" or "HDCP2.1" based on the latest version that is supported by the Wi-Fi display sink and the transmission control protocol (TCP) port number to be used on the Wi-Fi display sink for the HDCP 2.0/2.1 authentication and key interchange (AKE) connection is included. The port number may be between 1 and 65535.

wfd-content-protection="wfd_content_protection:" SP cp-spec CRLF
    cp=spec="none"/hdcp2-spec
    hdcp2-spec=("HDCP2.0"/"HDCP2.1") SP "port=" IPPORT; TCP port Referring to FIG. 2, an application 34 running on the source device 10 may communicate (HDCP AUTH 36) with the hardware component 22 through HDCP2 authentication middleware 30 and encode/encrypt middleware 32. The application authenticates the adapter 18 in remote device 16 by calling the authenticater 26. The authenticater generates an HDCP2 key 28. It then programs the key in a secure way in the encoder/encrypter 24. Next, the application communicates the key to the remote adapter 18.

The application sends video data to the hardware encoder/encrypter 24. The hardware encoder/encrypter 24 encodes the video data and then encrypts a bitstream buffer on the fly. Next, the application transmits the bitstream buffer to the remote adapter 18 via HDCP ENCODE/ENCRYPT 38.

A sequence according to some embodiments may be implemented in software, firmware and/or hardware. In software and firmware embodiments it may be executed by computer readable instructions stored in one or more non-transitory computer readable media such as magnetic, optical and semiconductor storages.

Figure 3:
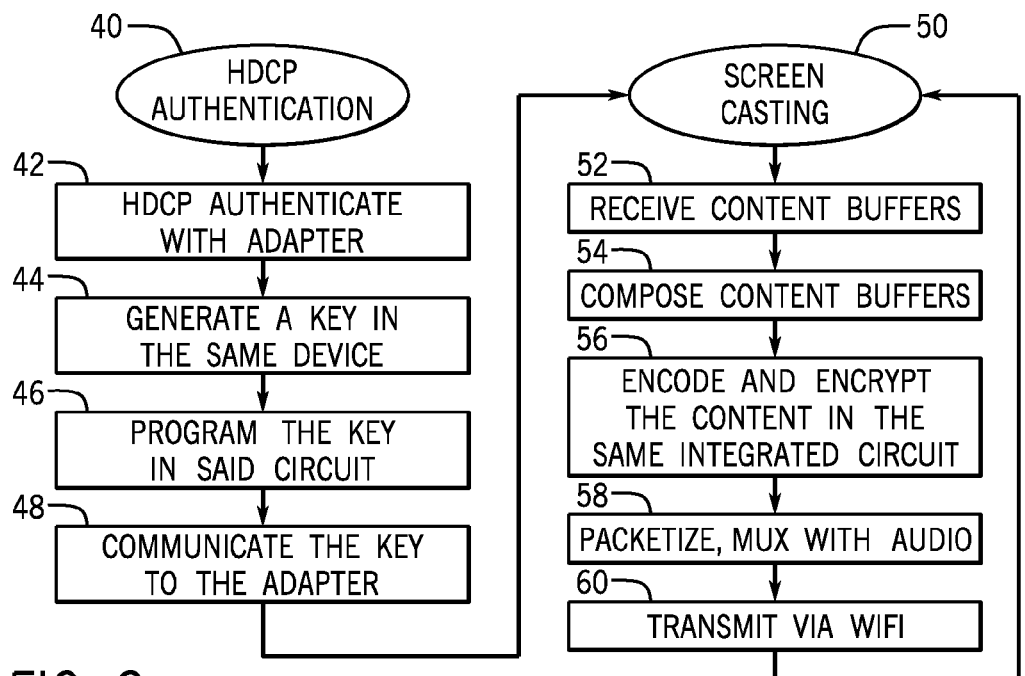
FIG. 3 is a flow chart for one embodiment.

The screencasting sequence shown in FIG. 3 may be used for sending video from one peer device such as any processor-based system to another peer device such as a display in the form of a television, a laptop computer or a projector, to mention a few examples. The screencasting is considered peer-to-peer because it may be transmitted from one processor-based device to another all at the user level. In other words there is no need to send anything through a server or the cloud or the like. Typically the screencasting may be done over a suitable wireless protocol.

The sequence shown in FIG. 3 includes an HDCP authentication sequence 40 whose result is then used in a screencasting sequence 50. The HDCP authentication begins by performing HDCP authentication with an adapter as indicated in block 42 (using blocks 30 and 26 in FIG. 2). Then a key is generated in the hardware component 22 of FIG. 2, as indicated in block 44 in FIG. 3. Next the key is programmed in encoder/encrypter as indicated in block 46. Finally the key is communicated to the adapter (block 48).

The flow continues with the screencasting sequence 50 by receiving content buffers as indicated in block 52. Then the content buffers are composed as indicated in block 54.

The content in the same integrated circuit (e.g. hardware unit 22 in FIG. 2) is encoded and encrypted in block 56. Then the content is packetized and multiplexed with audio as indicated in block 58 and then transmitted via WiFi as indicated in block 60, from source 12 to sink 16 in FIG. 2.

Figure 4:
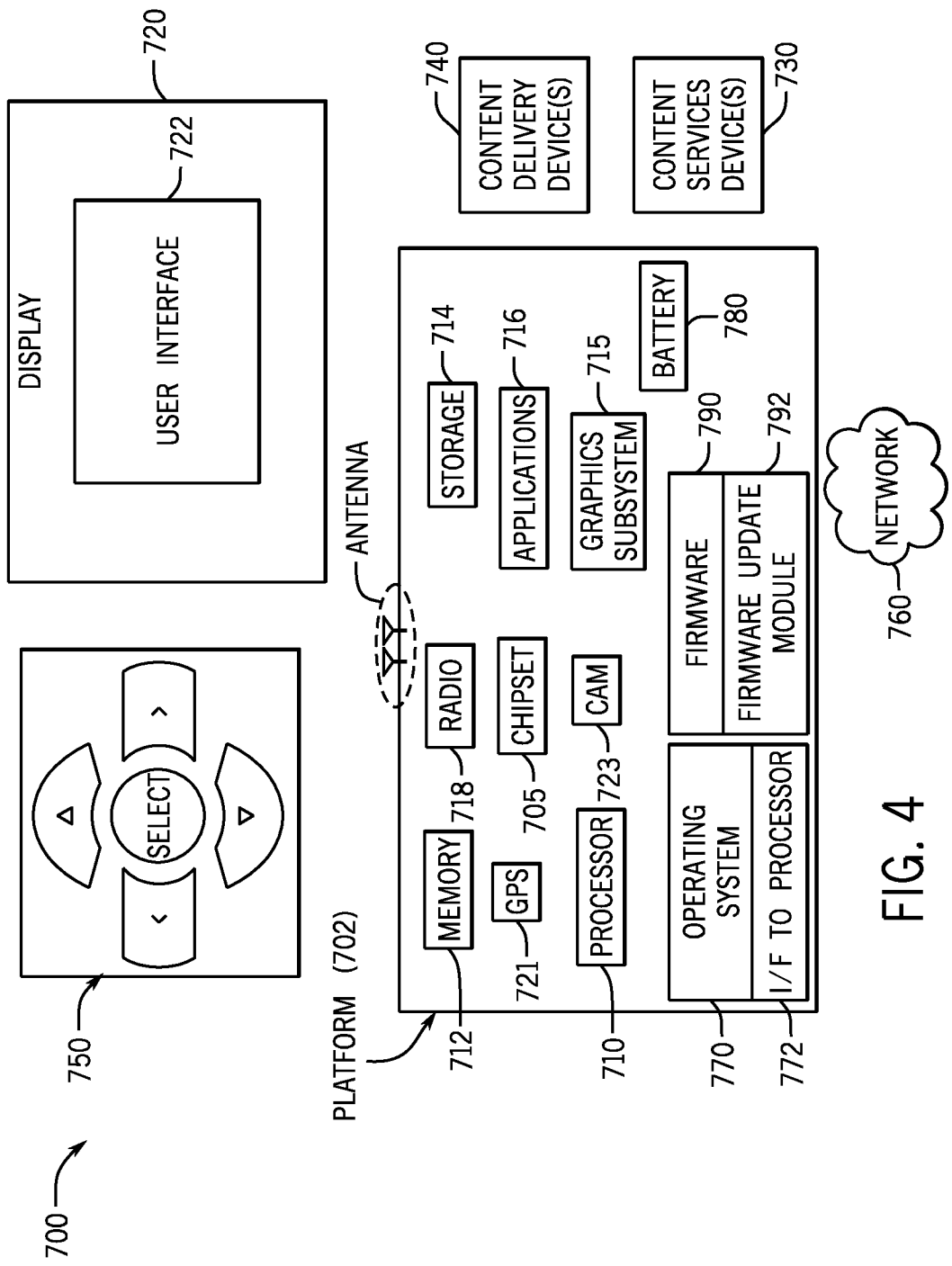
FIG. 4 is a system depiction for one embodiment.

FIG. 4 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequence of FIG. 3 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to scope limiting.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information.

Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 4.

Figure 5:
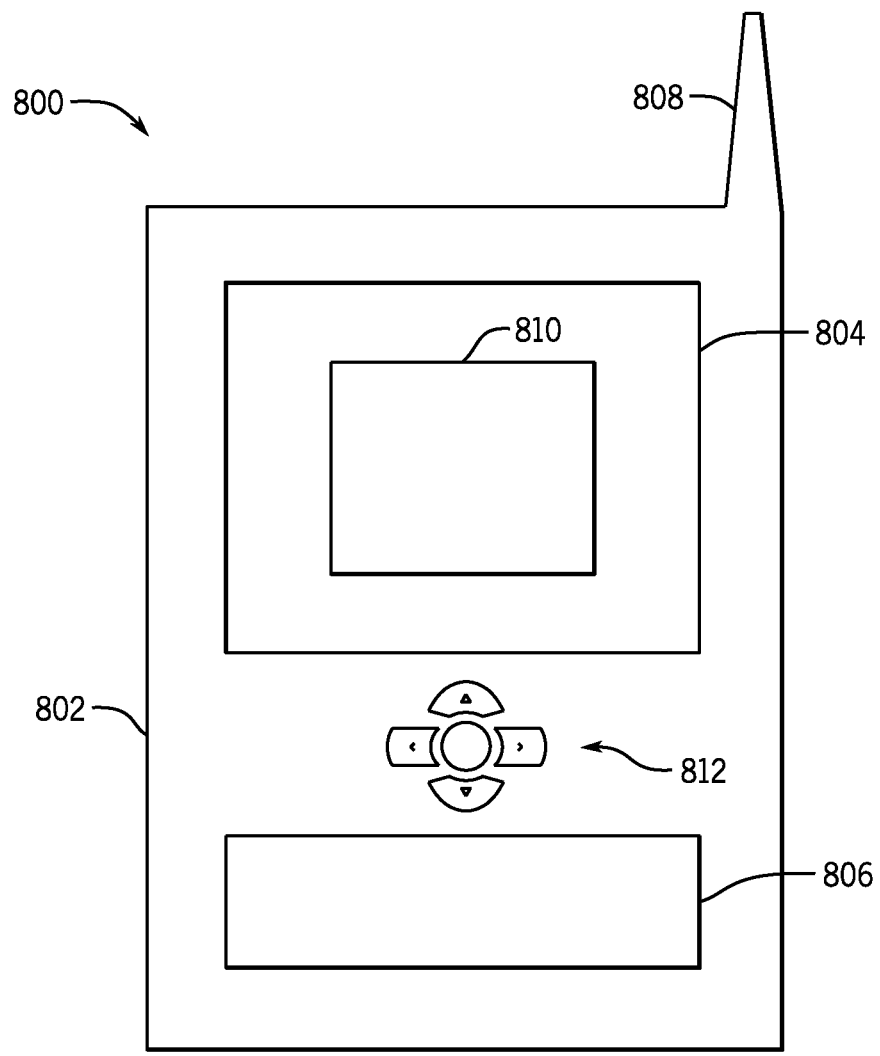
FIG. 5 is a front elevation for a system according to FIG. 4 in one embodiment.

As described above, system 700 may be embodied in varying physical styles or form factors. FIG. 5 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 710 may communicate with a camera 722 and a global positioning system sensor 720, in some embodiments. A memory 712, coupled to the processor 710, may store computer readable instructions for implementing the sequences shown in FIG. 3 in software and/or firmware embodiments.

As shown in FIG. 5, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

The following clauses and/or examples pertain to further embodiments:

One example embodiment may be a method comprising receiving video in a source for transmission to a display, using one integrated circuit to encode and encrypt the video before transmission to the display and authenticating an adapter associated with the remote display before transmitting the video. The method may also include authenticating said adapter in said integrated circuit. The method may also include generating a key. The method may also include programming the key in said circuit. The method may also include thereafter communicating the key to the adapter. The method may also include authenticating said adapter in said integrated circuit. The method may also include performing wireless screencasting to the display. The method may also include performing peer-to-peer wireless screencasting.

In another example embodiment may be one or more non-transitory computer readable media storing instructions to perform a sequence comprising receiving video in a source for transmission to a display, using one integrated circuit to encode and encrypt the video before transmission to the display, and authenticating an adapter associated with the remote display before transmitting the video. The media may include said sequence including authenticating said adapter in said integrated circuit. The media may include said sequence including generating a key. The media may include said sequence including programming the key in said circuit. The media may include said sequence including thereafter communicating the key to the adapter. The media may include said sequence including authenticating said adapter in said integrated circuit. The media may include said sequence including performing wireless screencasting to the display. The media may include said sequence including performing peer-to-peer wireless screencasting.

Another example embodiment may be an apparatus comprising a video receiver to receive video, a remote display coupled to said receiver, said display including a remote adapter, and one integrated circuit to encode and encrypt the video and authenticate said adapter before transmission to the display. The apparatus may include said integrated circuit to authenticate said adapter in said integrated circuit. The apparatus may include said integrated circuit to generate a key. The apparatus may include said integrated circuit to program the key in said circuit. The apparatus may include said integrated circuit to thereafter communicate the key to the adapter. The apparatus may include said integrated circuit to authenticate said adapter in said integrated circuit. The apparatus may include said integrated circuit to perform wireless screencasting to the display. The apparatus may include said integrated circuit to perform peer-to-peer wireless screencasting. The apparatus may include a display communicatively coupled to the circuit. The apparatus may include a battery coupled to the circuit. The apparatus may include firmware and a module to update said firmware.

The foregoing description of one or more implementations provides illustration and description, but is not intended to be exhaustive or to limit the scope of the invention to the precise form disclosed. Modifications and variations are possible in light of the above teachings or may be acquired from practice of various implementations.

What is claimed is:

1. A method comprising:
   receiving video in a source for transmission to a display; and using only one application program interface call, so that additional buffers do not need to be allocated and latency from an extra software calls can be reduced, to both encode and encrypt the video before transmission to the display by:
  performing authentication of an adapter in a wireless sink by calling, from an application running on a source, an authenticator in an integrated circuit in the source;
  generating a key in the integrated circuit authenticator;
  programming the key in the authenticator;
  communicating, in response to the application program interface, the key to the adapter;
  using the application program interface to cause video to be sent to the integrated circuit;
  encoding and encrypting the video in the same integrated circuit without writing into an encoding buffer in memory and then reading out from the memory which would result in additional latency; and
  transmitting the encoded and encrypted video from the adapter in response to the application program interface.

2. The method of claim 1 including authenticating said adapter in said application program interface.

3. The method of claim 1 including performing wireless screencasting to the display.

4. The method of claim 3 including performing peer-to-peer wireless screencasting.

5. One or more non-transitory computer readable media storing instructions to perform a sequence comprising:
  receiving video in a source for transmission to a display; and
  using only one application program interface call, so that additional buffers do not need to be allocated and latency from an extra software calls can be reduced, to both encode and encrypt the video before transmission to the display by:
    performing authentication of an adapter in a wireless sink by calling, from an application running on a source, an authenticator in an integrated circuit in the source;
    generating a key in the integrated circuit authenticator;
    programming the key in the authenticator;
    communicating, in response to the application program interface, the key to the adapter;
    using the application program interface to cause video to be sent to the integrated circuit;
    encoding and encrypting the video in the same integrated circuit without writing into an encoding buffer in memory and then reading out from the memory which would result in additional latency; and
    transmitting the encoded and encrypted video from the adapter in response to the application program interface.

6. The media of claim 5, said sequence including performing wireless screencasting to the display.

7. The media of claim 6, said sequence including performing peer-to-peer wireless screencasting.

8. An apparatus comprising:
  a processor coupled with memory:
  a video receiver to receive video;
  a remote display coupled to said receiver, said display including a remote adapter; and
  an encoder and encrypter to use only one application program interface call, so that additional buffers do not need to be allocated and latency from an extra software calls can be reduced, to both encode and encrypt the video before transmission to the display by performing authentication of an adapter in a wireless sink by calling, from an application running on a source, an authenticator in an integrated circuit in the source, generating a key in the integrated circuit authenticator, to program the key in the authenticator, communicating, in response to the application program interface, the key to the adapter, using the application program interface to cause video to be sent to the integrated circuit, encoding and encrypting the video in the same integrated circuit without writing into an encoding buffer in memory and then reading out from the memory which would result in additional latency; and
  transmitting the encoded and encrypted video from the adapter in response to the application program interface.

9. The apparatus of claim 8, said integrated circuit to perform wireless screencasting to the display.

10. The apparatus of claim 9, said integrated circuit to perform peer-to-peer wireless screencasting.

11. The apparatus of claim 8 including a display communicatively coupled to the circuit.

12. The apparatus of claim 8 including a battery coupled to the circuit.

13. The apparatus of claim 8 including firmware and a module to update said firmware.

\* \* \* \* \*